United States Patent [19]

Sims et al.

[11] Patent Number: 5,106,588
[45] Date of Patent: Apr. 21, 1992

[54] MONOLITHIC CATALYTIC CONVERTER

[75] Inventors: Gregory S. Sims, Detroit; Slater W. Hawes, Linden, both of Mich.

[73] Assignee: General Motors Corporation, Detroit, Mich.

[21] Appl. No.: 559,766

[22] Filed: Jul. 30, 1990

[51] Int. Cl.⁵ .............................. B01D 53/36
[52] U.S. Cl. .................. 422/180; 422/190; 422/222; 55/484; 55/486; 55/523; 55/524; 60/299; 60/301; 423/213.5
[58] Field of Search ........ 422/180, 190, 222; 423/213.5, 385.3, 482; 55/484, 486, DIG. 30, 523, 524; 60/299, 301

[56] References Cited

U.S. PATENT DOCUMENTS

| | | | |
|---|---|---|---|
| 3,957,445 | 5/1976 | Foster | 23/288 FB |
| 4,128,506 | 12/1978 | Hegedus et al. | 252/466 PT |
| 4,134,733 | 1/1979 | Volker et al. | 422/177 |
| 4,225,561 | 9/1980 | Torres | 422/180 X |
| 5,026,273 | 6/1991 | Cornelison | 422/180 X |

*Primary Examiner*—Lynn M. Kummert
*Attorney, Agent, or Firm*—Domenica N. S. Hartman

[57] ABSTRACT

A catalytic converter for use in an automobile exhaust gas system suitable for use with an alcohol-containing fuel is provided. Preferably, the catalytic converter contains a palladium-impregnated ceramic honeycomb monolith disposed upstream of a platinum/rhodium-impregnated ceramic honeycomb monolith relative to the exhaust gas flow, such that the exhaust gas contacts the palladium-impregnated monolith before contacting the platinum/rhodium-impregnated monolith.

5 Claims, 1 Drawing Sheet

MONOLITHIC CATALYTIC CONVERTER

This invention generally relates to an automobile catalytic converter of extruded ceramic monolithic honeycomb or formed metallic foil monolithic structure for treatment of automotive exhaust gas. More particularly, this invention relates to such an automobile catalytic converter suitable for use in an alcohol-containing fuel application wherein a palladium-impregnated monolith is utilized upstream of a platinum/rhodium-impregnated monolith.

BACKGROUND OF THE INVENTION

Monolithic catalytic converters typically include an extruded ceramic honeycomb structure of a refractory material such as cordierite ($2MgO\text{-}5SiO_2\text{-}2Al_2O_3$) or mullite, ($3Al_2O_3\text{-}2SiO_2$). Formed metallic foil monolithic structures are also commonly used. This monolithic structure is wash coated with a thin layer of a catalyst carrier such as alumina or zirconium oxide of very high surface area. The high surface area carrier is usually impregnated uniformly throughout with a noble metal mixture such as platinum, palladium, rhodium.

After the monolithic structure and the catalyst are heated to the activation temperature of the catalyst, the noxious components of the automobile exhaust gas such as unburned hydrocarbons (UHC), carbon monoxide (CO) and nitrogen oxides (NOx) react at the catalyst site to form harmless gaseous products. Each catalyst material has a different activation temperature at which the rate of the catalyzed reaction increases from very low to very high levels. Therefore, it is desirable to design a monolithic converter for automobile emission controls which can heat up quickly to the activation temperatures of the catalyst materials or alternatively, which is characterized by a lower activation temperature. This is particularly important for alternative fuel applications, such as alcohol-containing fuels like methanol, since the alcohol-containing fuel generates undesirable aldehydes.

The use of an alcohol-containing fuel is problematic because the alcohols only partially combust in the combustion chamber, thereby resulting in the formation of these aldehydes. These aldehydes must be converted to harmless gaseous products, similarly to (as well as with) the unburned hydrocarbons and carbon monoxide. This conversion of the aldehydes may be accomplished in a conventional catalytic converter when the catalysts are heated to a sufficient temperature above the catalysts' activation temperature. Another and more significant problem is that the unburned alcohol-containing fuels from the combustion chamber may be only partially oxidized on the catalytic converter producing aldehydes. The formation of these aldehydes is more likely during the period when the catalyst temperature is in the transition region below its activation temperature.

An alternative mode for determining catalyst efficiency is to reference its "light-off" time, which is defined as that time period required for the catalyst to reach 50 percent efficiency in reacting with a particular noxious gas component. Obviously, a lower light-off time is more desirable. Therefore, in order to eliminate, or at least minimize, the formation of these undesirable aldehydes, it is necessary to provide a catalytic converter which is characterized by a low light-off time.

What is needed then is a monolithic catalytic converter for alcohol-containing fuel applications which minimizes the formation of aldehydes, such as by providing a catalytic converter characterized by a rapid heat-up and corresponding lower light-off time.

BACKGROUND OF THE INVENTION

It is an object of this invention to provide an exhaust gas treatment monolithic catalytic converter for use with an alternative fuel such as an alcohol-containing fuel like methanol.

It is a further object of this invention that such a converter be characterized by a lower light-off time than conventional catalytic converters so as to minimize the amount of aldehydes generated by partial oxidation of the alcohol-containing fuel on the catalytic converter.

In accordance with a preferred embodiment of this invention, these and other objects and advantages are accomplished as follows.

A catalytic converter for use in an automobile exhaust gas system when utilizing an alcohol-containing fuel is provided. The catalytic converter contains a palladium-impregnated monolith disposed upstream in the exhaust gas of platinum/rhodium-impregnated monoliths.

An inventive feature is that aldehyde formation resulting from the partial oxidation of the alcohol-containing fuel was minimized because the palladium-impregnated monolith, which is characterized by a faster light-off and more efficient combustion of the hydrocarbons, initially contacts the exhaust gas. This results in a more efficient catalysts of the unburned alcohol-containing exhaust gas particularly when the catalyst temperature is in the transition region between low activity and high activity. With this catalytic converter having the palladium-impregnated monolith provided upstream, aldehyde and alcohol conversion to harmless gases was maximized when using an alcohol-containing fuel such as methanol.

Other objects and advantages of this invention will be better appreciated from a detailed description thereof, which follows.

BRIEF DESCRIPTION OF THE DRAWINGS

The above and other advantages of this invention will become more apparent from the following description taken in conjunction with the accompanying drawing wherein.

DESCRIPTION OF THE PREFERRED EMBODIMENTS

Figure 1:
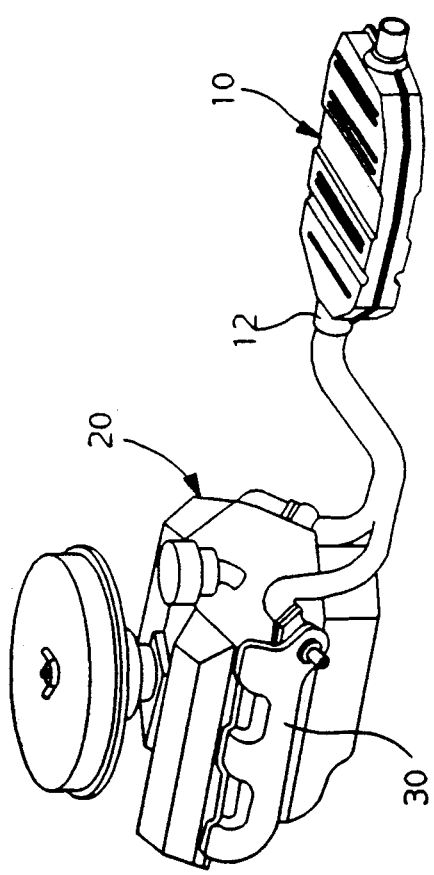
FIG. 1 is a perspective view showing an automobile combustion engine, exhaust manifold and catalytic converter.

A catalytic converter for treatment of automotive exhaust gas suitable for use with an alcohol-containing fuel such as methanol is provided. As shown perspectively in FIG. 1, the exhaust gases generated by the automotive internal combustion engine 20 are provided to the catalytic converter 10 at an inlet port 12 via the exhaust manifold 30.

Figure 2:
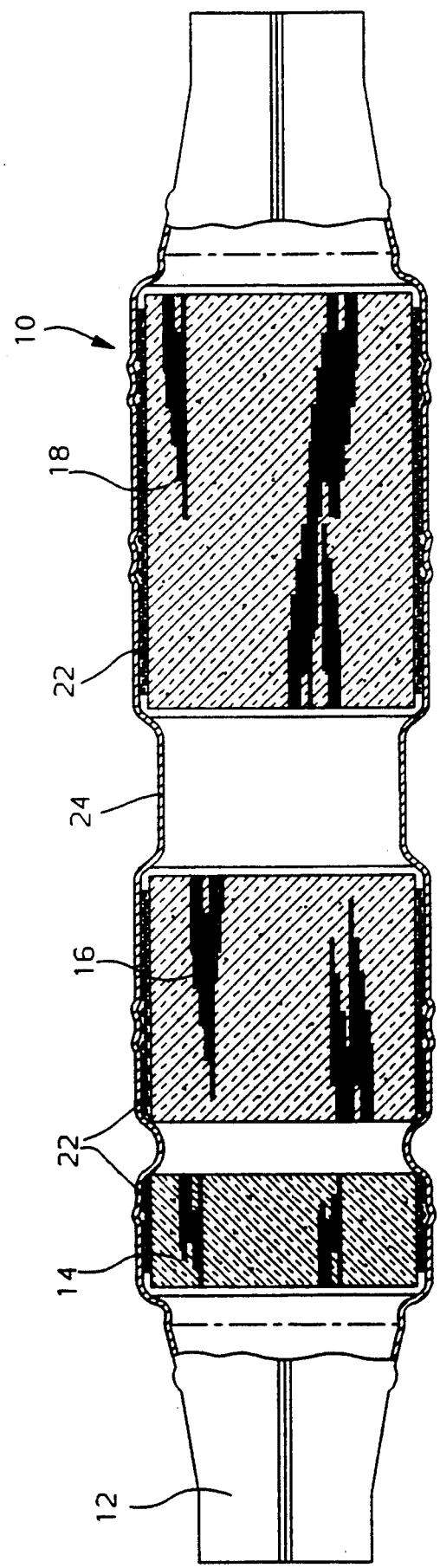
FIG. 2 is a cross-sectional view of a catalytic converter formed in accordance with a preferred embodiment of this invention.

The catalytic converter 10 shown cross-sectionally in FIG. 2 contains at least two monolithic elements. Three monoliths 14, 16 and 18 are preferred, as shown, to ensure complete catalysis of the noxious exhaust gases. The monoliths 14, 16 and 18 are formed from a refractory material, preferably cordierite (2MgO-5SiO$_2$-2Al$_2$O$_3$), however other materials such as mullite, (3Al$_2$O$_3$-2SiO$_2$)and formed metallic foil monoliths have also been used with success. The monoliths 14, 16 and 18 are then wash coated with a thin layer of a catalyst carrier (not shown for clarity), preferably alumina (Al$_2$O$_3$) or zirconium oxide (ZrO$_2$), which is characterized by a very high surface area. The high surface area catalyst carrier is then impregnated uniformly throughout with a noble metal catalyst. The monoliths 14, 16 and 18 are rigidly packaged utilizing a corrugated screen 22 within a stainless steel, or other appropriate metal, case 24.

The exhaust gas is fed into the catalytic converter 10 through its inlet port 12. The first ceramic monolith 14 which contacts the exhaust gas is impregnated with a high concentration of palladium (Pd), preferably at least about 75 grams of palladium per cubic foot. This is about two to three times greater than the normal concentration of palladium conventionally used, further the palladium is typically in combination with other noble metals. By providing a high concentration of palladium just past the inlet port 12 so as to make initial contact with the exhaust gas, aldehyde emissions generated by partial combustion of the alcohol-containing fuel within the engine is substantially reduced. Also, aldehyde emissions generated by partial oxidation of the unburned alcohol on the catalyst is reduced. This occurs because the high concentration of palladium is characterized by an ability to heat-up rapidly, therefore resulting in a faster transition from low activity to high activity, as well as an ability to combust the unburned hydrocarbons more efficiently thereby also generating more heat which further promotes the efficiency of the catalyst. These characteristics of the palladium result in more thorough combustion of the aldehydes, as well as the unburned hydrocarbons, carbon monoxide and nitrogen oxides. Also, partial oxidation of unburned alcohol to aldehydes is reduced.

It is preferred that at least a concentration of about 75 grams of palladium per cubic foot be utilized. This ensures a high concentration of the palladium to promote a faster warm-up and sufficient amount of the palladium catalytic sites for combustion, yet does not unduly affect the cost and practicality of the final product. In addition, lesser amounts of palladium may also be used, however this would decrease the efficiency of the aldehyde combustion within the catalytic converter.

This first monolith 14 is located upstream within the catalytic converter from at least one other monolith. In the preferred embodiment, second and third monoliths 16 and 18 are employed to ensure complete combustion of the noxious gases, although only one is necessary. The three monoliths 14, 16 and 18 are spaced apart within the stainless steel case 24 so as to ensure adequate exhaust gas flow. The second and third monoliths 16 and 18 are wash-coated with a high surface area carrier (not shown for clarity), such as alumina, and then the high surface area carrier is impregnated with a noble metal catalyst. The noble metal catalyst is typically a mixture of at least one of the metals chosen from the group consisting of platinum (Pt), palladium (Pd) and rhodium (Rh), however it is not primarily palladium. This catalyst mixture is characterized by a light-off time significantly slower than the light-off time for the palladium impregnated first monolith 14. The second and third monoliths 16 and 18 are suitable for normal combustion of the unburned hydrocarbons, carbon monoxide and nitrogen oxides. It is to be noted that the lengths of the individual monoliths 14, 16 and 18 may vary so long as a sufficient length of palladium-impregnated monolith 14 is provided upstream adjacent to the inlet port 12.

A specific example is as follows using corresponding reference numerals. An approximately two inch long cordierite monolith 14 having a wash coat of high surface area alumina was impregnated with about 0.04 troy ounces of palladium. This palladium-impregnated monolith 14 was located adjacent to the inlet port 12 of the catalytic converter 10, and upstream from two similarly formed monoliths 16 and 18 of about eight to ten inches in total length (drawing not to scale for clarity purposes) which were uniformly impregnated with a noble metal mixture containing platinum and rhodium in the amounts of about 0.067 and 0.009 troy ounces respectively. After simulating approximately 50,000 miles of aging, the catalytic converters 10 formed in this manner were evaluated on an engine dynamometer characterization test. The catalytic converter 10 formed in this manner was approximately 98 percent efficient in converting unburned hydrocarbons including the undesirable aldehydes, approximately 97 percent efficient in converting carbon monoxide and approximately 97 percent efficient in converting nitrogen oxides, to harmless gaseous products. These conversion efficiencies are comparable to a conventional catalytic converter having a uniform distribution of the platinum and rhodium distributed throughout the catalyst.

In addition, the catalytic converter formed in accordance with this invention having the palladium-impregnated monolith reached 50 percent efficiency (or warmed-up), in about half the time, 20 seconds, as compared to a conventional catalytic converter without the palladium-impregnated monolith for converting the hydrocarbons and about a third of the time, 12 seconds, conventionally required for converting the carbon monoxide as shown in Table 1.

TABLE 1

| | Warm-Up Times (seconds) | |
|---|---|---|
| | Hydrocarbons | Carbon Monoxide |
| Palladium-Impregnated Catalytic Converter formed in accordance with this Invention | 20 | 12 |
| Standard Catalytic Converter | 40 | 32 |

These reduced times required for reaching 50 percent efficiencies indicate a significant increase in efficiency for the catalyst 10 of this invention having the palladium impregnated monolith 14 and further indicate that the catalyst 10 begins conversion of the undesirable aldehydes and noxious gases earlier than a conventionally formed catalytic converter. These reduced times also indicate that catalyst 10 warms-up more quickly and therefore spends less time in the transition temperature region. This will minimize partial oxidation of unburned alcohols to aldehydes. The same catalytic converter 10 was evaluated on a Vehicle 1975 Federal Test Procedure for fuel containing 85 percent Methanol. Those results are shown in Table 2. Most particularly, the aldehyde emissions from the converter was reduced from about 0.024 grams per mile with the standard catalytic converter to about 0.0114 grams per mile with the palladium-impregnated catalytic converter made in accordance with this invention.

TABLE 2

1975 Federal Test Procedure Results for Fuel Containing 85 Percent Methanol (grams per mile)

|  | Unburned Fuel | Carbon Monoxides | Nitrous Oxides | Aldehydes |
|---|---|---|---|---|
| Palladium-Impregnated Catalytic Converter Formed in Accordance With this Invention | 0.18 | 2.3 | 0.11 | 0.0114 |
| Standard Catalytic Converter | 0.24 | 2.1 | 0.2 | 0.024 |

The catalytic converter formed in accordance with this invention is characterized by a lower light-off time and therefore suitable for use with alcohol-containing fuels, such as methanol, which generate undesirable aldehydes. However, it may also be utilized satisfactorily with conventional fuels for treatment of conventional exhaust gas. While the invention has been described in terms of a preferred embodiment, it is to be appreciated that those skilled in the art will readily apply these teachings to other possible variations of the invention, such as by modifying the desired lengths of the palladium-impregnated and platinum/rhodium-impregnated monoliths, or by only using a palladium-impregnated monolith. Accordingly the scope of this invention is to be limited only by the following claims.

The embodiments of the invention in which an exclusive property or privilege is claimed are defined as follows:

1. A catalytic converter for treatment of automotive exhaust gas comprising:
   a monolithic structure having a first region and a second region, said first and second regions having a high surface area coating deposited thereon;
   a high concentration of palladium deposited onto said high surface area coating at said first region; and
   a uniform loading of catalyst material deposited onto said high surface area coating at said second region, said catalyst material selected from the group consisting of rhodium, platinum and palladium, alone and in combination;
   whereby when said monolithic structure is positioned within the flow of the exhaust gas for treatment of the exhaust gas, said first region is located upstream of said second region within the flow of the exhaust gas, such that the automotive exhaust gas contacts said first region prior to contacting said second region.

2. A catalytic converter for treatment of exhaust gas as recited in claim 1 wherein said uniform loading of catalyst material deposited on said second region consists essentially of platinum and rhodium.

3. A catalytic converter for treatment of automotive exhaust gas comprising a monolithic structure having a high surface area ceramic deposited thereon;
   wherein the improvement comprises having a first region and a second region of said monolithic structure, and providing a high concentration of palladium on the high surface area ceramic at said first region and providing a uniform loading of a catalytic material selected from the group consisting of palladium, platinum or rhodium, alone and in combination on the high surface area ceramic at said second region, whereby when said monolithic structure is positioned within the flow of the exhaust gas for treatment of the exhaust gas, said first region is located upstream of said second region within the flow of the exhaust gas, such that the exhaust gas contacts said first region prior to contacting said second region.

4. A catalytic converter for treatment of automotive exhaust gas comprising a monolithic structure having a high surface area ceramic deposited thereon;
   wherein the improvement comprises having a first region and a second region of said monolithic structure, and providing a high concentration of palladium on the high surface area ceramic at said first region and providing a uniform loading of a catalytic mixture containing platinum and rhodium on the high surface area ceramic at said second region, whereby when said monolithic structure is positioned within the flow of the exhaust gas for treatment of the exhaust gas, said first region is located upstream of said second region within the flow of the exhaust gas, such that the exhaust gas contacts said first region prior to contacting said second region.

5. A catalytic converter for treatment of automotive exhaust gas when utilizing an alcohol-containing fuel comprising;
   a monolith having a high surface area ceramic deposited thereon, and a first and second region of said monolith;
   said high surface area ceramic of said first region having a high concentration of palladium deposited thereon;
   said high surface area ceramic of said second region having a uniform loading of a catalytic mixture primarily consisting of platinum and rhodium;
   wherein when said monolithic structure is positioned within the flow of the exhaust gas for treatment of the exhaust gas, said first region is located upstream of said second region in the flow of the exhaust gas such that the exhaust gas contacts said first region prior to contacting said second region.

* * * * *